United States Patent [19]

Hepworth et al.

[11] E Patent Number: Re. 32,548

[45] Reissued Date of Patent: Nov. 24, 1987

[54] TILE PARTING DEVICES

[75] Inventors: Paul S. Hepworth, Oadby; Martin G. Whitehouse, Kibworth, both of England

[73] Assignee: Plas Plugs Ltd., Derby, England

[21] Appl. No.: 13,951

[22] Filed: Feb. 12, 1987

Related U.S. Patent Documents

Reissue of:

[64] Patent No.: 4,444,174
Issued: Apr. 24, 1984
Appl. No.: 339,868
Filed: Jan. 18, 1982

[30] Foreign Application Priority Data

Jan. 16, 1981 [GB] United Kingdom ..... 8101400

[51] Int. Cl.[4] ..... B26F 3/00; B28D 1/32

[52] U.S. Cl. ..... 125/23 T; 33/32.2; 33/143 J; 225/96.5

[58] Field of Search ..... 225/96.5, 103, 104; 125/23 T, 23 R, 23 C; 33/143 M, 143 J, 143 K, 32.1, 32.2; 30/212, 191, 193

[56] References Cited

U.S. PATENT DOCUMENTS

| | | | |
|---|---|---|---|
| 1,375,747 | 4/1921 | Zigray | 33/143 M |
| 2,212,599 | 8/1940 | Hall | 225/104 |
| 2,245,959 | 6/1941 | Brown | 33/143 J X |
| 2,589,501 | 3/1952 | Lenarduzzi | 125/23 T |
| 3,231,978 | 2/1966 | Sanders | 33/143 M |
| 4,026,262 | 5/1977 | Yasuga | 225/96.5 X |
| 4,079,513 | 3/1978 | Harrison | 30/193 |
| 4,084,569 | 4/1978 | Chrismas | 33/32.2 X |

FOREIGN PATENT DOCUMENTS

| | | | |
|---|---|---|---|
| 1509776 | 5/1978 | United Kingdom | 125/23 T |

*Primary Examiner*—Frank T. Yost
*Attorney, Agent, or Firm*—Spensley Horn Jubas & Lubitz

[57] ABSTRACT

The invention concerns a device for parting tiles, particularly ceramic tiles, along a predetermined path. The device includes measuring means having a caliper arrangement to measure the width of an area to be covered by a tile, a tile-receiving region including a fixed point and a slidable member, said member having an elongate slot in which is engageable a cutting edge of a combined scoring and parting means, also provided with tile parting jaws. The caliper arrangement may be arranged to allow for a grouting gap.

9 Claims, 10 Drawing Figures

TILE PARTING DEVICES

Matter enclosed in heavy brackets [ ] appears in the original patent but forms no part of this reissue specification; matter printed in italics indicates the additions made by reissue.

BACKGROUND OF INVENTION

The invention is concerned with improvements in or relating to tile parting devices. The invention particularly relates to parting cladding tiles along scored rectilinear paths. Examples of tiles which may be parted by use of the invention are ceramic wall-tiles having a glazed surface.

BRIEF DESCRIPTION OF THE INVENTION

The invention provides a device for use in parting cladding tiles along a pre-determined path comprising measuring means having a caliper arrangement to measure the width of an area to be covered by a tile, means to receive a tile of a width in excess of the width so measured, and means to indicate upon a surface of said tile the path of a parting line to reduce the width of the tile by a required amount at least as great as the excess width, and a scoring and parting means including a cutting edge adapted to co-operate with said measuring means to follow said parting line path and jaw members having a chevron-shaped tile-receiving opening.

Advantageously, the path indicating means of the measuring means is adapted to increase said required amount by which the tile width is to be reduced by a predetermined constant amount equal to a grouting gap to be left between adjacent cladding tiles, irrespective of the measured width.

Conveniently, the indicating means comprises a limb movable with said caliper arrangement and provided with an elnongate slot, said slot having contoured side walls adapted to co-operate with shoulders formed on the scoring and parting means in the region of and flanking said cutting edge.

Advantageously, the jaw members are operable by means of a movable lever, which spring urged outwardly of the scoring and parting means and is retained by catch means in a retracted position within the scoring and parting means when not in use.

BRIEF DESCRIPTION OF DRAWINGS

There now follows a detailed description of a device according to the invention. It will be understood that the description is given by way of example only and not by way of limitation.

In the drawings.

DETAILED DESCRIPTION OF DRAWINGS

Figures 1, 2:
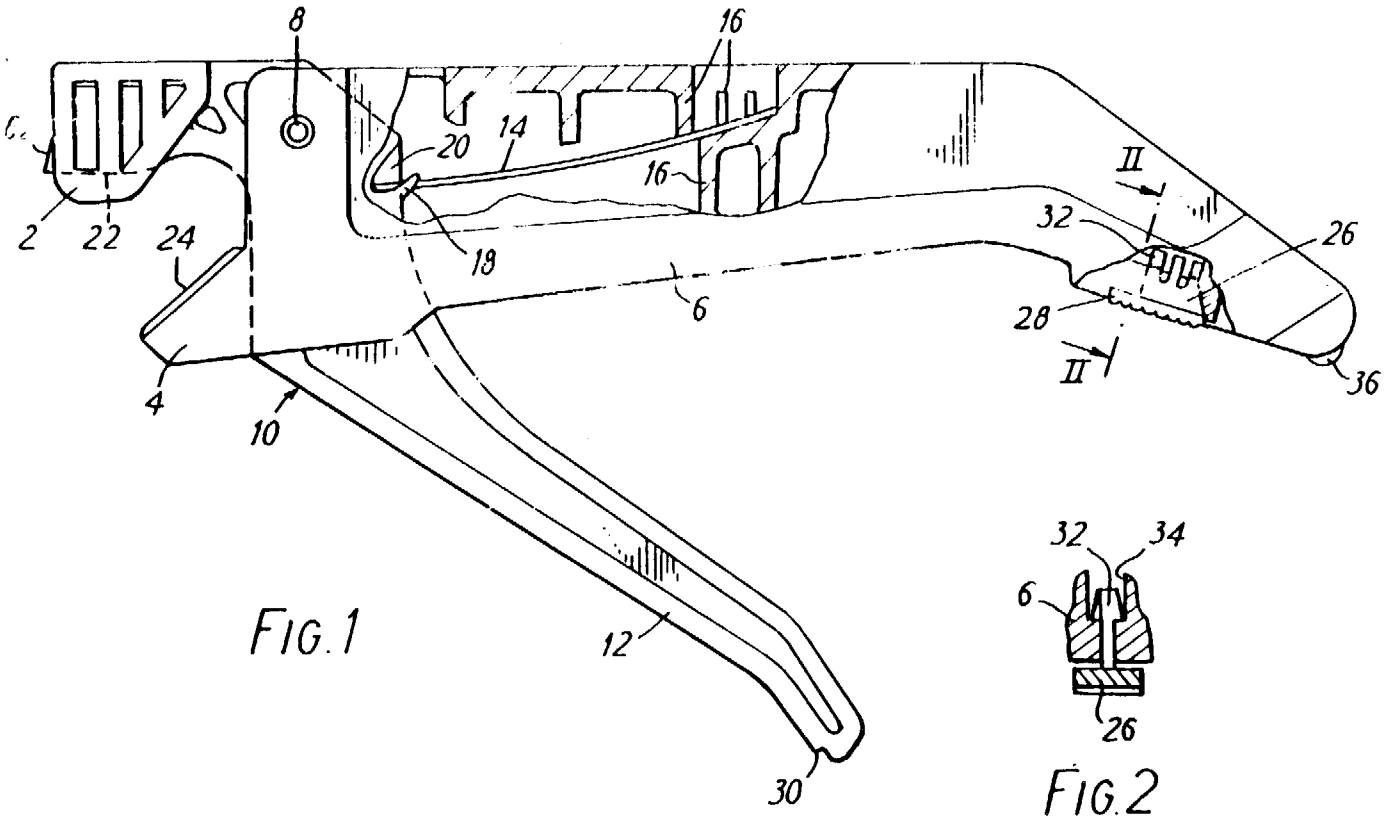
FIG. 1 shows a side view, partly in section, of scoring and parting means of the device.
FIG. 2 is a fragmentary section on II—II of FIG. 1.

FIG. 1 shows a combined scoring and parting means having jaw members 2, 4, in an open condition. The jaw 4 is formed at one end of a main body portion 6 having a pivot mounting 8 for a lever 10. The jaw 2 is formed at one end of the lever 10, the opposite end portion of which comprises an operating handle 12. The lever 10 is biased into the position shown in FIG. 1 by means of a spring wire 14 mounted within the body portion 6 so that the right hand end thereof (as viewed in that Figure) is received between internal webs 16, and the left hand end is trapped between a projection 18 and a web portion 20 (see also FIG. 4) of the lever 10.

Figure 8:
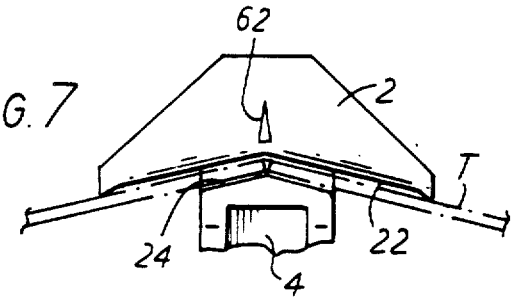
FIG. 8 is a view in the direction of arrow A of FIG. 4, showing the parting jaws in use.

Confronting surfaces 22, 24 of the jaws 2 and 4 are contoured to present a chevron-shaped opening, as may be more clearly seen in FIG. 8.

Figure 3:
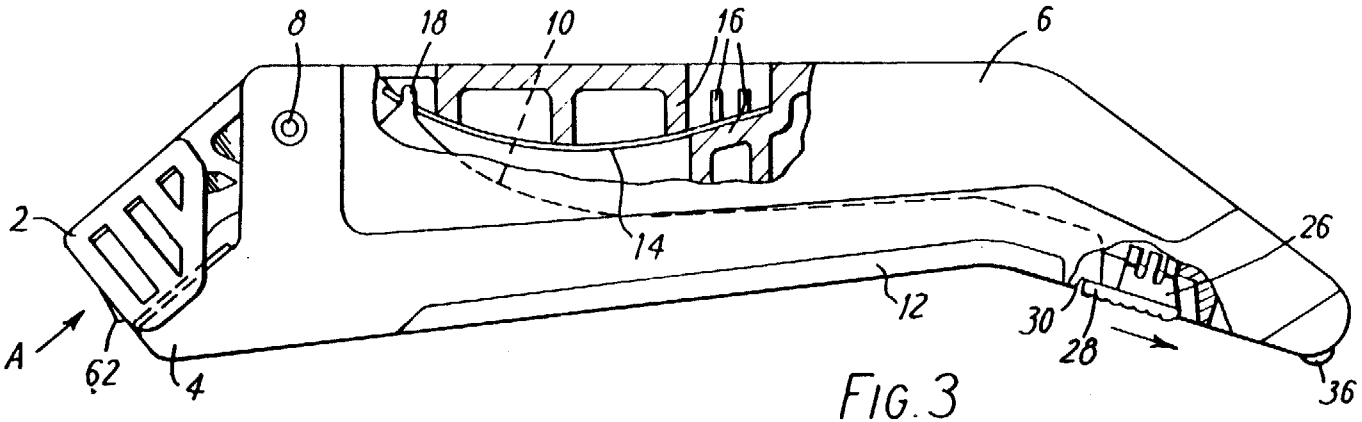
FIG. 3 is a side view similar to FIG. 1 showing jaw members of the device in a closed condition.
Figure 7:
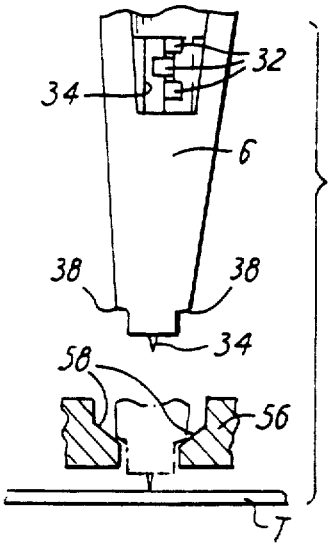
FIG. 7 is a diagrammatic illustration of the co-operation of the scoring and parting device with the indicating means.

When it is desired to move the jaw member 2 towards the jaw member 4 to close the members, the lever 10 becomes almost fully received within the body portion 6 as shown in FIG. 3. The spring wire 14 takes up a stressed, curved position and therefore the lever 10 requires to be retained in the retracted position shown in FIG. 3 by means of a sliding catch 26 having a leading edge or lip 28 engagable with a recess 30 on the end of the handle 12. The catch 26 incorporates three hooked prong portions 32 which engage in a staggered manner with a groove 34 within the body portion 6, (see also FIG. 7).

At the extreme right hand end of the body portion 6 (as seen in FIGS. 1 and 3) is mounted a rotary cutting disc 36 having a tungsten carbide edge. Two shoulders 38, one at each side of the body portion 6, flank the disc 34. The functions of these shoulders will be explained below.

Figure 5:
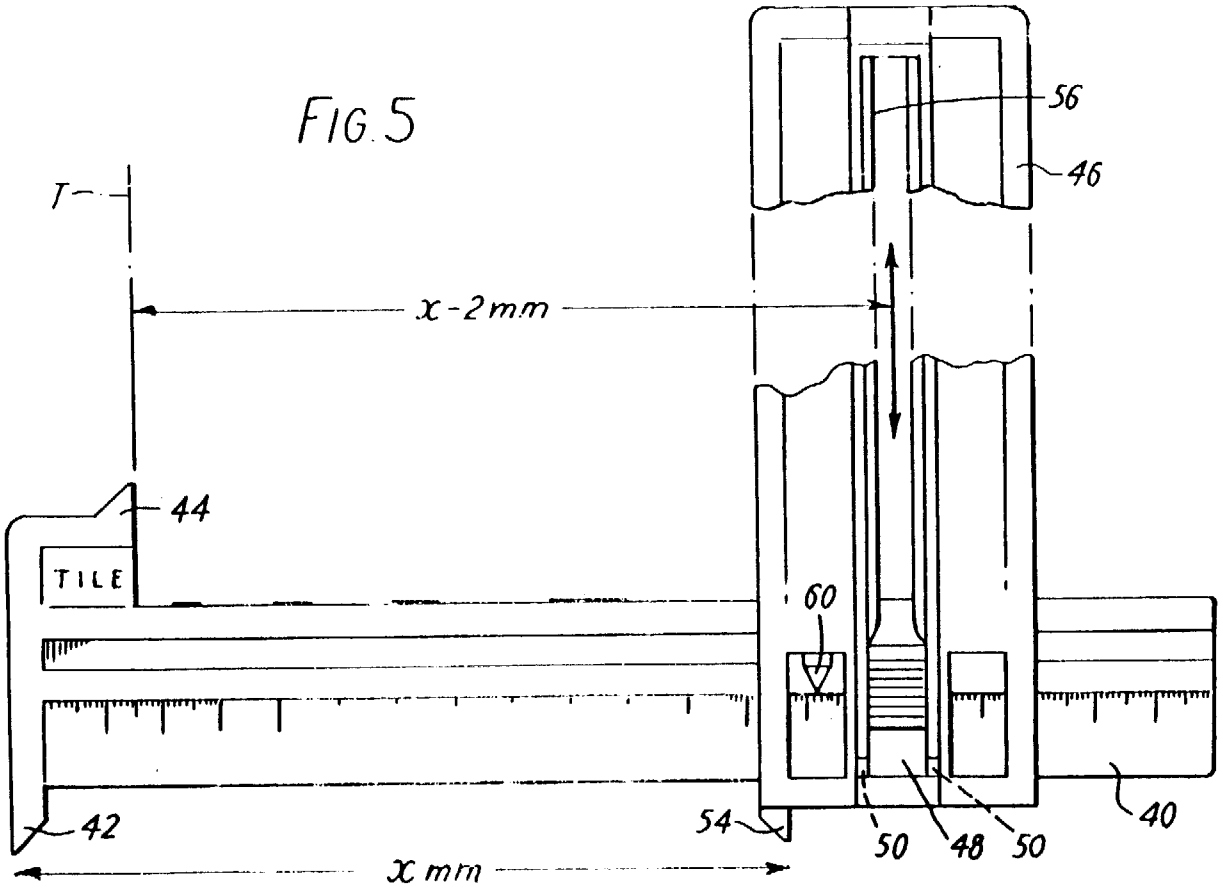
FIG. 5 is a plan view of the measuring means of the device.
Figure 6:
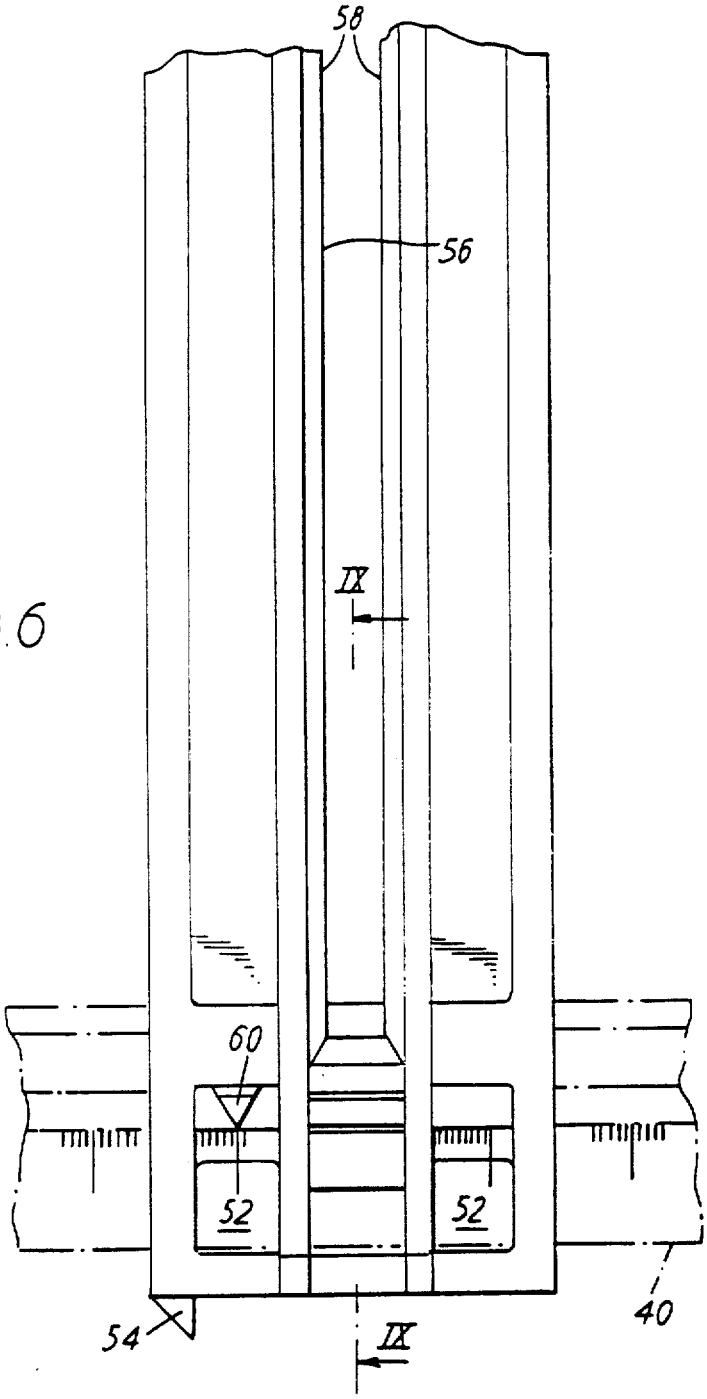
FIG. 6 is a fragmentary plan view of the indicating means of the measuring means.
Figure 9:
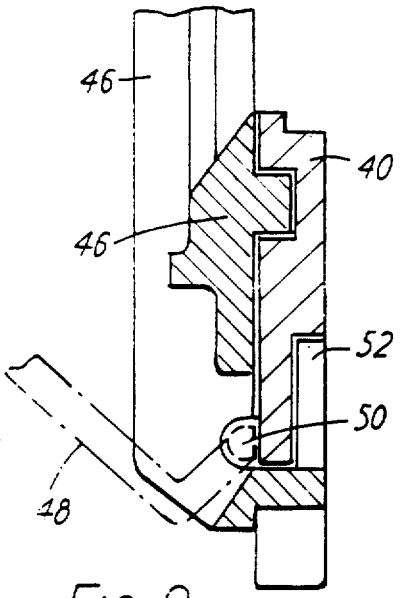
FIG. 9 is a fragmentary sectional view taken along line IX—IX of FIG. 6, to an enlarged scale.

FIG. 5 illustrates the measuring means of the parting device. A calibrated scale 40 is provided with two fixed pointers 42 and 44. A path indicating member 46 is mounted at one end thereof for sliding movement along the scale 40. The member 46 is securable in the desired position on the scale by means of a cammed fastener 48. In FIG. 9, the member 46 is shown freely slidable on the scale 40, with the fastener 48 in a released condition. The fastener 48 is substantially L-shaped and at the free end of its inner limb are provided two lateral projections 50 (see also FIG. 5). These projections 50 are D-shaped in cross section, the straight edge of the D-shape lying adjacent the scale 40 in FIG. 9.

Figure 10:
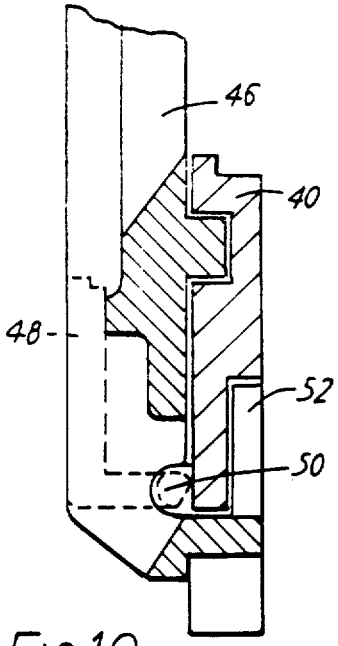
FIG. 10 is a view similar to that of FIG. 9, with a securing fastener in an operative position.

Movement of the fastener 48 to the closed position shown in FIG. 10 causes the curved edge of each D-shaped projection 50 to abut the scale 40 and retain the member 48 firmly in position against the scale which is captive between the projections 50 and lugs 52 extending from the scale.

Figure 4:
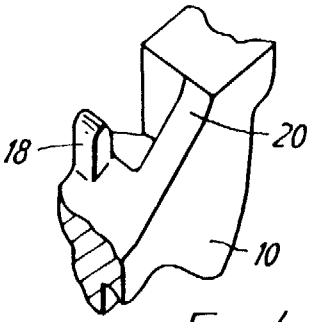
FIG. 4 is a fragmentary perspective view, to an enlarged scale, of a part shown in FIGS. 1 and 3.

The member 46 is provided, at its lower end as viewed in FIG. 4, with a projection 54 which together with projection 42 form a caliper arrangement. The member 46 is also provided with an elongate slot 56 having contoured side walls 58 (FIG. 7) which are arranged to co-operate with shoulders 38 of the body portion 6.

The operation of the parting device is as follows:

With the fastener 48 in the released condition, the scale 40 is laid against the area to be covered by a cut tile and the widtl. of the area measured off by means of the caliper arrangement so that the distance X between the projections 42 and 54 represents exactly the width of the area. For convenience a pointer 60 on the member 46 indicates the value of the distance X on the calibrated scale 40. It is necessary to cut a tile to fit the area, but the cut tile should ideally be 2 mm narrower than the width of the area in order to leave room for the insertion of conventional grouting material in the gaps around the tiles when adhered to a wall.

It is therefore arranged that when the tile T which is to be cut is positioned aginst the projection 44 the slot 56 indicates the path along which the tile must be parted to give a tile width of x−2 mm. The line is scored by placing the cutting disc 34 of the scoring and parting means centrally of the slot 56 (FIG. 7) and moving the scoring and parting means with the sliding catch 26 in the closed condition, so that the glazed on the tile is scored through. The contoured surface 58 of the walls of the slot 56 guide the disc by contact with the shoulders 38 so that the disc cuts a score line along a longitudinal centre line of the slot.

The scored tile T is then place in the jaws 2, 4, the sliding catch 26 having been released, with the scored line immediately below a pointed 62 on the jaw 2. Squeezing pressure on the handle 12 causes the jaws to close and part the tile along the score line as illustrated in FIG. 8.

The cut tile may be bonded to the wall area with suitable adhesive and then grouting material applied to the 1 mm gap allows at each side thereof.

Various modifications made made within the scope of the invention.

We claim:

1. A tile parting system for parting cladding tiles along a pre-determined path, comprising:

(a) measuring means having a caliper arrangement for measuring the width of an area to be covered by a tile, means for receiving a tile of a width in excess of the width so measured, and means defining an elongated slot, for indicating upon a surface of said tile the path of a parting line to reduce the width of the tile by a required amount at least as great as the excess width; and (b) scoring and parting means including a cutting edge, said cutting edge selectively insertable through said slot such that said tile may be scored along said parting line path by said cutting edge, and jaw members movably disposed in said scoring and parting means and having a chevron-shaped tile-receiving opening.

2. A device as claimed in claim 1, wherein the path indicating means of the measuring means is arranged to increase said required amount by which the tile width is to be reduced by a predetermined constant amount equal to a grouting gap to be left between adjacent cladding tiles, irrespective of the measured width.

3. A device as claimed in claim 1 wherein the indicating means comprises a limb movable with said caliper arrangement and provided with said elongated slot, said slot having contoured side walls adapted to co-operate with shoulders formed on the scoring and parting means in the region of and flanking said cutting edge.

4. A device as claimed in claim 3, wherein the caliper arrangement of the measuring means is provided with two fixed pointers, a first one of which is associated with a movable pointer in order to enable measurement of the width of an area to be covered by a tile, the second fixed pointer being associated with said elongate slot so that the distance measurable between the first fixed pointer and the movable pointer is reproduced between the second fixed pointer and the slot.

5. A device as claimed in claim 4, wherein the position of the second fixed pointer is selected in relationship to the first fixed pointer to allow for a grouting gap so that the distance reproduced between the second fixed pointer and the slot is reduced by a predetermined constant amount.

6. A device as claimed in claim 1, wherein the jaw members are operable by means of a movable lever, which spring urged outwardly of the scoring and parting means and is retained by catch means in a retracted position within the scoring and parting means when not in use.

7. A device as claimed in claim 1 wherein said scoring and parting means further includes a main body defining a first portion of said jaw members and a handle defining a second portion of said jaw members pivotably jointed to said main body.

8. A device as claimed in claim 7 wherein said scoring and parting means further includes spring means for urging said handle into a predetermined position.

9. A device as set forth in claim 8 wherein said cutting edge and said first portion of said jaw member are positioned at opposite ends of said main body.

* * * * *